US006904461B1

(12) United States Patent
Randhava et al.

(10) Patent No.: US 6,904,461 B1
(45) Date of Patent: Jun. 7, 2005

(54) METHOD FOR MAKING TIME-SENSITIVE DETERMINATIONS OF TRAFFIC INTENSITY FOR A VISITABLE SITE

(75) Inventors: Surjit S. Randhava, Evanston, IL (US); Sarabjit S. Randhava, Evanston, IL (US); Sikander S. Randhava, Evanston, IL (US); Scott Erickson, Evanston, IL (US); Bonnie Shifrin, Chicago, IL (US)

(73) Assignee: Unitel Technologies, Inc., Mt. Prospect, IL (US)

( * ) Notice: Subject to any disclaimer, the term of this patent is extended or adjusted under 35 U.S.C. 154(b) by 778 days.

(21) Appl. No.: 09/692,701

(22) Filed: Oct. 19, 2000

(51) Int. Cl.[7] ............................................. G06F 15/173
(52) U.S. Cl. ........................................ 709/224; 709/225
(58) Field of Search ................................. 709/224, 225, 709/226, 229; 715/513, 4, 204, 501

(56) References Cited

U.S. PATENT DOCUMENTS

| | | | | |
|---|---|---|---|---|
| 5,974,572 A | * | 10/1999 | Weinberg et al. | 714/47 |
| 6,182,097 B1 | * | 1/2001 | Hansen et al. | 715/526 |
| 6,278,966 B1 | | 8/2001 | Howard et al. | 703/23 |
| 6,301,619 B1 | | 10/2001 | Segman | 709/231 |
| 6,317,787 B1 | * | 11/2001 | Boyd et al. | 709/224 |
| 6,445,689 B2 | * | 9/2002 | Bruenle | 370/336 |
| 6,606,657 B1 | * | 8/2003 | Zilberstein et al. | 709/224 |
| 6,651,098 B1 | * | 11/2003 | Carroll et al. | 709/224 |

OTHER PUBLICATIONS

International Search Report issued in PCT/US01/31725 dated Dec. 6, 2001.
Wingfield, "The Tricky Task of Tracking Web Users," *Wall Street Journal*, pp. B1 and B6 (dated prior to Oct. 19, 2000).

* cited by examiner

*Primary Examiner*—Mehmet B. Geckil
(74) *Attorney, Agent, or Firm*—Marshall, Gerstein & Borun LLP

(57) ABSTRACT

A method and apparatus determines an inbound traffic intensity of a visitable site, wherein the inbound traffic intensity factor is representative of a measure of meaningful visits to a visitable site in a given time period. The inbound traffic intensity factor is determined by obtaining visitor information including the number of visits to the visitable site during the given time period as well as the duration of each visit and using both the number visits and the time spent during each visit to quantify the traffic to the site during the time period.

40 Claims, 1 Drawing Sheet

METHOD FOR MAKING TIME-SENSITIVE DETERMINATIONS OF TRAFFIC INTENSITY FOR A VISITABLE SITE

FIELD OF THE INVENTION

The present invention generally relates to measuring the audience of a visitable enterprise, such as a web-based or a non-web based enterprise, and more particularly, to a new and improved audience measurement method for use in a host situation wherein the time spent by a visitor at the visitable enterprise is an important factor.

BACKGROUND OF THE INVENTION

Internet companies, advertisers and Wall Street investors, to name but a few, desire accurate counts of the number of visitors their web sites or other visitable sites or enterprises actually receive. Web companies brag about their numbers in prospectuses. Advertisers use these numbers to determine how many viewers their advertisements will reach. Investors want third party data to justify their investments in companies and may use these numbers for such verification.

Although the Internet was supposed to be the most measurable medium ever, and was supposed to be able to instantly track and record millions of clicks, most independent measurement companies still use surprisingly old-fashioned methods for measuring the number of visitors to a web site. In one frequently employed method, "panels" are recruited, with these panels including thousands of users who agree to install special software that tracks every online move the users make. These panels function much like the legendary squads of television viewers monitored by Neilsen Media research to provide so called "Neilsen Ratings" for television broadcasts and programming.

Increasingly, web publishers and online merchants are questioning the findings derived from panel sampling methods and, instead, are gathering vast quantities of information on their own by examining a digital trail or "log files" left by visitors visiting the web sites. These web enterprises claim that the log files provide exact representations of their audiences and that these measurements are more accurate than panel based projections of audience size.

The panel sampling and projection proponents for measuring web site audiences criticize the log file approach because the log files cannot distinguish between unique visitors and those who log on more than one time to a web site from different computers. In addition, hits made by crawlers, that is the software programs that scour the Internet on behalf of search engines, may be counted, which could inflate the recorded traffic, even though no actual visitor is really looking at the site during these hits.

On the other hand, the log file digital trail proponents criticize the panel based sampling methods because the demographic makeup of the panel can sometimes skew the results for a particular web site, causing this web site to be under-represented and under counted. Moreover, panel based sampling methods frequently do not track international traffic, which penalizes many companies or sites that receive many or most of their visitors from overseas. The large disparities between the projected audience numbers obtained by panel sampling methods as compared with the digital trail log file counting methods remain a cause for concern.

Regardless of which method is used for obtaining Internet audience user data, the commercially available products and services provided as Internet Audience Measurements, (IAM) tend to indicate the popularity of web site by reporting the total number of "hits" and/or "visits" that are recorded at a particular site during any given time interval, usually a month. Another approach that has been used reports the total amount of time spent by visitors at given web site. The primary thrust of either of these techniques is always directed at collecting and profiling vast quantities of bulk data. Typically information about the total number of hits or visits made to a site is collated with significant amounts of supporting demographic information. The net results tend to fall into a predictable pattern of tables of statistics, matrices and other historical recaps. However, this information can be hard to read or analyze.

Thus, there are many shortcomings in the currently available methods for determining inbound traffic intensities for visitable enterprises. Simply measuring the total number of hits or visits to a particular visitable site does not differentiate between longer, more meaningful stays, and very short accidental or otherwise unmeaningful visits. On the other hand, simply counting the number of total minutes spent at a site may give skewed results because individuals may establish a connection to a web site and then leave their computer for one reason or another, thereby clocking minutes when no meaningful visit is occurring.

Accordingly, a better and more intelligent measure of the audience or traffic to a web site or other visitable site, or more broadly stated, a better way of measuring the viewers or visitors to any visitable enterprise is still needed, especially by members of the business, advertising and investing communities.

SUMMARY OF THE INVENTION

In an effort to overcome the deficiencies in the prior art methods of measuring and quantifying the popularity of a visitable site, the present invention provides a new and improved method for determining the popularity of a host site or enterprise wherein the time spent by a visitor to the visitable site is a factor of some importance. This method provides, at least in some respects, a better and more meaningful tool for measuring the intensity of the incoming traffic to a visitable site, such as an Internet web site, because this method generates a meaningful index or number, referred to herein as an inbound traffic intensity factor, reflecting both the intensity and the quality of inbound viewer and visitor traffic.

The method and apparatus for determining an inbound intensity factor as described herein provides an effective technique for tracking the trend of audience traffic over time. For example, this method and apparatus provide a meaningful comparative number or index which can indicate how a particular visitable site is doing by providing information with respect to what the audience of that site has been, what the current trends in the audience visiting that site are and how well the audience for the visitable site compares against the site's own prior history, immediate competitors, and the rest of the visitable sites to which that site may be compared.

In one embodiment, a method and apparatus for determining an inbound traffic intensity factor of a visitable site, representive of a measure of meaningful visits to a visitable site in a given time period, obtains visitor information including the number of visits to the visitable site during the given time period and obtains or measures the duration of each visit. Thereafter, the method and apparatus calculate an inbound traffic intensity factor for the visitable site for the given period of time by combining the numbers of visitors with the length of each unit. In one embodiment, the intensity factor is computed by determining the time for each particular visit raised to a preset power and summing these values.

DETAILED DESCRIPTION

Figure 1:
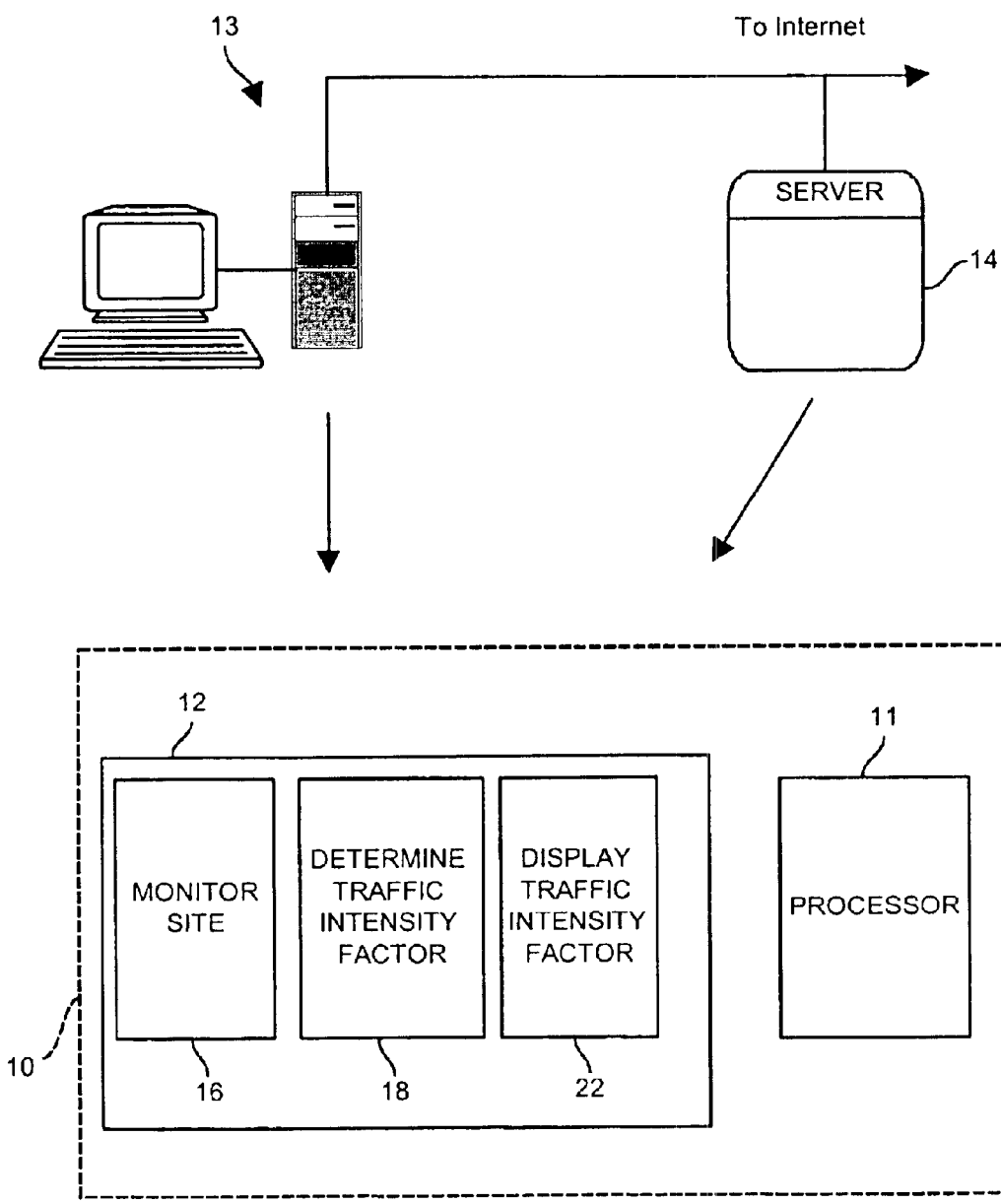
FIG. 1 is a block diagram of computer systems having software thereon that implements a method of determining an inbound traffic intensity factor for a visitable site.

Generally speaking, a method and apparatus for quantifying the number and quality of visits made to a visitable site is provided. The method and apparatus determine an inbound traffic intensity factor for a visitable site taking into account the time spent by a visitor at the site, such as a website, as well as the number of visitors during a particular period of time. As used herein, "visitable site" is a broad term intended to include Internet or e-commerce visitable sites, like websites, as well as non-web visitable sites. Examples of non-web visitable sites include broadcast communications such as television, radio, cable, or satellite broadcasts or transmissions and the like. Visitable sites may also include a wide variety of periodicals and other publications including magazines, trade journals, books or other publications. The term also encompasses advertisements appearing in print, on radio or television, or Internet media, as well as a wide variety of public exhibitions including trade shows, professional meetings, conventions and seminars, museums, art galleries, planetariums, oceanariums, aquariums, botanical gardens and other enterprises open to the public. The term visitable site can also include certain retail establishments interested in monitoring traffic through their facility. Of course, visitable web sites can include Internet web sites, chat rooms, news groups, search engines, as well as other Internet and/or intranet sites and other on-line sites and services.

Referring now to FIG. 1, a computer system 10 includes a processor 11 and a memory 12. As illustrated in FIG. 1, the computer system 10 may be part of any desired type of system, including a personal computer 13, a mainframe, a server 14 such as a web server, etc. The memory 12 stores a monitoring routine 16 or software program that monitors a particular visitable site. This visitable site may be a web site, which could be communicatively coupled to the computer system 10 via, for example, the Internet or other local area or wide area network or could be implemented on the computer system 10 itself. While monitoring the visitable site, the monitoring routine 16 collects data pertaining to each visit made to the site (i.e., the fact that a visit occurred) and measures the duration of each of the visits in any desired time units, such as seconds, minutes, hours, etc. The monitoring routine 16 may store this information in the memory 12. Also, if desired, the monitoring routine 16 may recognize whether the person or user visiting the site is a new visitor or a repeat visitor and may store this information. To perform this function, the monitoring routine 16 may store an identifier of each visitor to the site and review the stored list of visitor identifiers to see if the current visitor is a new visitor or is a repeat visitor. An indication of whether the visitor is a new or a repeat visitor may also be stored in the memory 12. Conversely, the monitoring routine 16 may simply store an identifier for each visitor and further processing performed at a later stage can be used to determine if a visitor is a new or repeat visitor.

For non-web sites or enterprises, such as periodicals, publications, broadcasts, exhibitions, advertisements, tradeshows, meetings, conventions, museums, zoos, aquariums, planetariums, botanical gardens and traffic associated with different kinds of retail establishments, to name but a few, the monitoring routine 16 may be a user interface that enables a user to enter data pertaining to the number and/or type of visitors and the length of time spent at the enterprise by each such visitor during a particular period of time.

After a predetermined or preset time period, such as a week, a month, etc., a second routine, referred to herein as a traffic intensity factor determination routine 18 uses the data collected and stored by the monitoring routine 16 to determine or calculate an inbound traffic intensity factor for that site or enterprise during the time period. This traffic intensity factor may be determined using the following formula:

$$ITIF_k = \sum_{i=1}^{N_k} t_i^x \tag{1}$$

wherein $ITIF_k$ is the inbound traffic intensity factor of the visitable site during the given time period k; i is a visit; and $N_k$ is the number of visits to the visitable site during the time period k. Here, i=1, 2, 3 ... $N_k$. Furthermore, $t_i$ is the number of incremental units of time associated with the visit i and x is a power factor preferably having a value such that x is greater than zero and less than one. The monitoring routine 16 and the traffic intensity determination routine 18 may operate independently or in coordination with each other as desired.

Thus, as will be understood, the method and apparatus for determining a traffic intensity factor first collects data pertaining to the visitors to a visitable site. Preferably, the collected visitor information includes an indication that a visit has occurred within a selected time period and an indication or measurement of the duration of the visit. This information may be determined in any known or standard manner using known web site monitoring technique such as those which use, for example, counters, data within the log files, etc. In addition to monitoring the total number of visits and the duration of each visit, it is preferable that data be obtained identifying new visitors from old visitors. Using this information, a total inbound intensity factor for a given time period, such as a month, for a given visitable site is equal to the sum of the inbound traffic intensity factor for new visitors to the site in a given month plus the inbound traffic intensity factor for old, return or repeat visitors using equation (1) above. The ability to provide this additional detail allows a visitable site owner to review the relative strength of each of these components to learn more about the effectiveness of the visitable site. For example, if the owner can determine that the ratio of new or first time viewers to the total inbound intensity factor is in a growing mode, that could indicate that promotional advertising efforts are bearing fruit. If the ratio of the inbound intensity factor for repeat or return visitors to the total inbound intensity factor is showing a positive trend, this may indicate to the site owner that their content or format has appeal and that repeat business is doing well.

In accordance with a preferred embodiment, the inbound traffic intensity factor for a visitable site is calculated on a calendar month basis, i.e., k=1 month. Because calendar months may have a different number of days in them, i.e., 31 days, 30 days or 28/29 days, the raw inbound traffic intensity factor results need to be normalized, so that the inbound traffic intensity factors calculated from month to month may be directly compared. In accordance with this aspect, if a month k has 31 days, a normalized monthly inbound traffic intensity factor may be obtained by multiplying the raw inbound traffic intensity factor by 0.98185 (i.e., 30.4375/31.0) to provide a normalized result. If month k has 30 days, a normalized inbound traffic intensity factor may be obtained by multiplying the raw inbound traffic intensity factor number by 1.01458 (i.e., 30.4375/30.0) to obtain its normalized monthly value. For the month of February, in a non-leap year, the normalizing multiplier is 1.08705 (i.e., 30.4375/28.0). In a leap year for the month of February, the normalizing multiplier is 1.04957 (i.e., 30.4375/29.0). Each of these normalization factors is based on the assumption that an average calendar year has 365.25 days and has 12 months. In accordance with this aspect of the invention, the determination routine 18 multiplies the raw inbound traffic intensity factors, as necessary, by the monthly normalization factor to provide a normalized inbound traffic intensity factor which may thereafter be compared directly, irrespective of the month in which the data was obtained.

Because the numbers involved in the inbound traffic intensity factors for a popular or growing visitable site may easily rise to a large number containing 8, 9, 10, 11 or 12 digits, or more, it may be beneficial to report the inbound traffic intensity factor or the normalized inbound traffic intensity factor using a log scale. For example, if the inbound traffic intensity factor is a large number, the number may be rewritten in scientific notation and the result reported logarithmically. For example, if the inbound traffic intensity factor normalized for the month is calculated to be 964 million, this may be rewritten in scientific notation as $9.64 \times 10^8$. These results may be reported on a logarithmic scale to state that audience performance was 9.64 at level 8. Alternatively, alphabetic indicators could be used to report these results, such that the audience for month k was 9.64 level H, reflecting a conversion of A=1, B=2, C=3, D=4 and so on. Of course, any other method of reporting the inbound traffic intensity factor may be used.

If desired, a normalized inbound intensity factor may be calculated for a given visitable site month after month, week after week, etc. so that meaningful comparisons of monthly (weekly, etc.) performance for that site may be evaluated. Also, normalized monthly inbound traffic intensity factors for a variety of different visitable sites may be compared directly, provided the inbound traffic intensity factors are calculated using the same value for the power factor x. In this manner, direct meaningful comparisons between the normalized monthly inbound traffic intensity factors may accurately reflect the differences in meaningful visits occurring at each visitable site in the given month.

Generally speaking, using the above formula, a given time period is used as a beginning and an end of the measurement period for determining the relative inbound traffic intensity or audience to a visitable site. In practical terms, a suitable time period such as seconds, minutes, hours, days, weeks, months or years may be employed, although any other desired time period may be used as well. Preferably, time period (k) is a week or a month because these time periods are perhaps the most useful for commercial purposes.

Of course, the duration of each visit $(t_i)$ is measured in any suitable incremental units of time for the audience of the visitable site being measured. These time units may be seconds, minutes or hours or other suitable time units. Preferably, for commercial purposes with respect to monitoring visitable Internet sites, the relevant time period $t_i$ is measured in minutes.

The inbound traffic intensity factor determined using the formula given above provides a meaningful tool for ratio- nalizing the intensity of incoming traffic to a given visitable site such as an Internet web site or other non-web visitable site. The inbound traffic intensity factor provides a single number that tells it all. This number provides a snapshot giving an overall feeling for the dynamics of the audience situation. Thus, instead of simply measuring the total number of hits or visits or instead of measuring only a total of the duration of the visits, the inbound traffic intensity factor provides a combination of these two variables in a single reading which results in a more meaningful measure.

Furthermore, the power factor x, having a value between zero and one, modifies the effect of the duration of a visit to focus on meaningful visits. The effects of visits that are too short to be meaningful are de-emphasized. Likewise, the effects of especially long visits, which are frequently less important to an audience analysis being undertaken, are also attenuated. More often than not, what is important is that the visits being tracked are meaningful visits having a duration longer than a mere mistake. Notwithstanding this, after a certain time period additional minutes do not contribute meaning to what the investigator needs to know. For example, if the visitable site is an Internet web site and the advertiser wants to know that visitors to the web site are staying at the site for a time period long enough for the advertising to be seen and to have an impact on the viewer, the advertiser may want to track meaningful visits of one minute to three minutes in length. Anything over three minutes may be less important to the advertiser's strategy. A simple duration measurement without a power factor such as x in equation (1) cannot discriminate in the manner desired by the analyst.

As will be understood, the duration $(t_i)$ raised to a fractional power factor, that is, an exponent x having a value between zero and one, has the effect in equation (1) of changing the shape of the curve to alter the effect of visit duration in a controlled manner to provide more meaningful overall results which are more useful to the individuals analyzing a visitable site audience. The power factor x may be varied so that it is closer to zero or closer to one depending on the type of visitable site being monitored. For example, for most short term visits such as web sites, a power factor of 0.5 for x is useful in making meaningful inbound traffic determinations. For visitable site analyses wherein the length of time is relatively less important, the power factor x may be moved closer to zero so that the calculated inbound traffic intensity factor is measuring hits with a minor contribution provided by the duration factor. In non-web applications, such as scientific periodicals, where a meaningful visit to the periodical requires a reader to spend relatively long periods of time going through the scientific journal, a power factor x of closer to one may be required to provide meaningful results. In these cases, the inbound intensity factor will tend to more closely resemble a summation of all of the durations where the effect of prolonged durations will be relatively more expressed.

If desired, the method and apparatus described herein may be used to audit the audience and/or popularity of non-web applications as well. Such non-web applications can be divided into separate categories. A first category includes those time-based non-web applications where the results are analyzed or reported on an ongoing basis in terms of the stipulated time period, for example days, weeks, months, etc. A second category of non-web visitable sites may comprise a discrete stand-alone non-web situation that may be characterized by some sort of birth to death process, i.e., an event based application. Here, inbound traffic intensity factors may be determined for non-web applications in accordance with slightly modified formulas of equation (1), depending on whether a total relevant population number is known.

More particularly, in accordance with this embodiment, the modified formula implemented by the traffic intensity determination routine 18 for determining the inbound traffic intensity for a time based non-web application may be as follows:

$$ITIF_{abs} = \frac{N}{n}\sum_{i=1}^{n} t_i^x \quad (2)$$

wherein $ITIF_{abs}$ is the absolute inbound traffic intensity factor associated with a time period k or with an event e. Here, N is the size of the total relevant population associated with the time period k or with the event e; n is the size of a sample drawn from N wherein n is selected to reflect N within stipulated statistical parameters; i is the number representing a visit and is equal to 1, 2, 3, 4, 5 . . . up to n; $t_i$ is the time recorded or measured for the visit or view i and x is the exponential power factor having a range such that x is greater than zero and less than one.

In those instances where a total relevant population number N is not known, a relative inbound traffic intensity factor may be calculated in accordance with the formula:

$$ITIF_{rel} = \frac{1}{n}\sum_{i=1}^{n} t_i^x \quad (3)$$

wherein $ITIF_{rel}$ is a relative inbound traffic intensity factor associated with the time period k or with event e; n is the size of the sample comprising the number of visits which represents a statistically significant sample size; i is representative of a particular visit and is a number such that i=1, 2, 3, 4 . . . up to n; $t_i$ is the time recorded or measured per visit or view i; and x is the exponential power factor having a value such that x is greater than zero and less than one.

For purposes of non-web applications and determinations, N represents the total population associated with the time period k or event e and will need to be tagged by means of an actual count, census, circulation number, published/accepted data or other valid estimating technique. Any final choice may depend on the exact nature of the non-web application being considered and is expected to be standardized and stipulated to accordingly.

For these non-web applications, n in the above formulas represents the sample size for a given period k or event e and may be computed using one of several accepted techniques such as conventional statistics, Bayesian mathematics, or statistical quality control theory, to name but a few. Ultimately, the sample size n should yield a number that accurately reflects N within stipulated confidence parameters. The exact sample determination technique that is selected will depend on the scope of the non-web application and the nature of the predicted underlying time frequency distribution. The method for computing n will preferably be standardized and stipulated to accordingly.

At this time with respect to non-web applications, it is difficult to make assumptions with respect to the shape of the relative time frequency diagrams associated with any particular non-web application. It may be possible to observe patterns which are easy to recognize, i.e., normal distributions, Poisson, binomial, exponential, Gamma or the like distributions. It is also quite likely that the diagram obtained will not fit any established pattern. Preferably, the sampling technique used for n should take these uncertainties into account.

In accordance with these above formulas for non-web applications, $t_i$ may be expressed in, for example, minutes, hours or even days. In many non-web applications including several types of event based scenarios that involve a finite birth to death cycle, it may be necessary to select or standardize a slice of time within which all of the sample n observations will have to be logged, in order to make meaningful comparisons between different event based non-web visitable enterprises. The results for non-web applications may be broken down into total inbound traffic intensity equals the inbound traffic intensity of return customers plus the inbound traffic intensity of new customers. The results may be normalized and/or expressed in scaled terms on a logarithmic basis as described above for web based applications.

In each of the foregoing web and/or non-web determinations, visitor information data may be gathered in accordance with any known and accepted method or procedure. Accordingly, manual polling, mechanical devices, telephones, electronic black boxes, hand held computers, surveillance cameras and videotapes or the like may all be used. Internet or intranet log files or digital trails may also be used, and the duration of each visit may be determined either automatically during the visit or after the fact using any desired technique.

Thus, as will be understood, an inbound traffic intensity factor for a visitable enterprise for a given period of time is determined, wherein this inbound traffic intensity factor is a number that takes into consideration not only the total number of hits or visits to the visitable site but also the duration of the visits in a manner calculated to provide a number which is representative of the number of meaningful visits to the visitable site in a given time period. The inbound traffic intensity factor for a given web site or visitable site may be tracked over an extended period of time, for example, month to month, so that changes or trends in inbound traffic intensity or audience for the visitable site can be rationally determined. In addition, calculating the inbound traffic intensity factors for multiple visitable sites over the same periods of time allows a rational comparison between different visitable sites with respect to their inbound traffic intensity or audience.

Also, as will be understood, visitor information to the visitable site is obtained for a selected time period which includes at least the number of visits to the visitable site during the time period and the duration of each said visit. The data collection may also include obtaining information as to whether or not the visitor visiting at each visit is a new, first time visitor or a repeat visitor. In accordance with this embodiment, a total inbound traffic intensity may be calculated as the sum of the inbound traffic intensity for new visitors and the inbound traffic intensity for old or repeat visitors.

Any manner of collecting visitor data known to those skilled in the art may be employed and newer methods for determining visitor traffic which might be developed may also be employed. Furthermore, once the data have been collected by any suitable data collection process, an inbound traffic intensity factor for the visitable site for the given time period is calculated in accordance with the techniques provided above. The inbound traffic intensity factors combine the variables of total hits and total time (such as in minutes) in a rational manner which more clearly identifies and quantities the meaningful visits to a visitable site. As has been mentioned above, the visitable site may be any host site including Internet web sites and non-web sites where the time spent by the visitor is important in evaluating the quality or the meaningfulness of the visit.

Still further, once the inbound traffic intensity factor has been determined, this factor may be displayed such as by, for example, a printing or other display routine 22 of FIG. 1.

This information may be printed or displayed (or spoken via a speaker) via any user output device, including a screen, a printer, a speaker, etc. Of course, the inbound traffic intensity factor may be determined for a number of time periods and stored in, for example, the memory 12 and then printed out or displayed at any desired time or location.

The advantages provided by the methods of the present invention are best explained by considering the following illustrative examples:

EXAMPLES 1–2

Example 1

Ranking Web Site Popularity by Hits, by Total Time and by Calculating Inbound Traffic Intensity Factor The benefits of calculating an inbound traffic intensity factor in accordance with the methods described herein are illustrated in the following example. Assume for purposes of this example that there are three hypothetical web sites A, B and C that record the following incoming traffic during the month of January:

Web site A—250 separate visits, each visit lasting an average of three minutes for a total of 750 minutes.

Web site B—250 separate visits, each visit lasting an average of 48 minutes for a total of 12,000 minutes.

Web site C—five separate visits, each lasting an average of 3,000 minutes for a total of 15,000 minutes.

Evaluation and Ranking by Number of Visits

If a conventional method for evaluating the audience for web sites A, B and C, on the basis of counting the total number of hits or visits is employed, then, for the above web sites during the month of January, web site A and web site B are tied at an equal number of 250 visits or hits each. Web site C having only five visits trails far behind. The fact that web site B logged a total of 12,000 minutes versus the 750 minutes for web site A is not credited if conventional methods of just simply counting hits is used as the audience measurement method.

Evaluation and Ranking by Total Time

If a conventional method of evaluating web site audience/popularity by counting up total connection time is used as the method for evaluating these web sites, a different ranking result is obtained. Under this method, Web site C is the clear winner with 15,000 minutes, followed by Web site B with 12,000 minutes.

Each of the above evaluation methods have limitations that renders their use less helpful in trying to come up with a rational basis for comparing the popularity of different web sites. In accordance with the techniques described herein, a method is employed which blends or considers both total hits and total duration in evaluating the popularity of a web site.

Evaluation and Ranking by Inbound Traffic Intensity Factor

If the inbound traffic intensity factor is calculated for each web site to evaluate these web sites, still another comparative ranking is obtained. The inbound traffic intensity factor merges the two variables of concern, i.e., the total number of visits and the time spent by each visitor into a single measure. Using the power factor x of 0.5, the following results are obtained:

Site A—ITIF=433

Site B—ITIF=1,732

Site C—ITIF=274.

Employing the methodology in accordance with the preferred embodiment of the present invention, a refreshingly different scenario is obtained. Web Site B is identified as having the greatest web site audience, Site A is ranked second and Site C is ranked third. The inbound traffic intensity factor determination permits a meaningful distinction to be made between Web Site A and Web Site B which cannot be provided by simply counting total hits. The methods of the present invention more accurately and correctly reflect web site popularity, as that term is intended by the advertising, business and investment communities.

Example 2

Non-Web Advertising Decision

In the following example, it is assumed that an advertiser needs to evaluate which of two professional publications offers the more meaningful advertising exposure to justify the expense of placing an ad in one publication rather than the other. Assume that prior studies have shown that scientific subscribers to each publication give each new issue a perfunctory flip through on the day the magazine arrives and generally do not sit down to review the journals until mid-month, as members of the scientific community begin to discuss the articles and content. During the middle of the month, once they get to them, the subscribing scientists spend significant time reviewing their journals. The advertiser can only afford to place an ad in a single publication, but not both.

Inbound Traffic Intensity Calculation for Monthly Trade Journal *Processing*

For the December 1999 issue of monthly trade journal *Processing*, a panel of subscribing readers is polled to record their reading habits. The journal is delivered to subscribers on the first of every month. Polling takes place at a sampling time of about 50% of the cycle over a span of 10% of cycle provides a sampling band range of 15–18 days after publication, i.e. over December 15–18. Nominal circulation for *Processing* in December 1999 is 75,000. A full page 4-color ad costs $8,455.00.

A panel of 28 subscribers is questioned as to their reading habits during December 15–18. Here, n is 28 (which may be statistically invalid, but is given for illustration purposes only). If a power factor x of 0.5 is used, the inbound traffic intensity factor for the December 1999 issue of *Processing* is determined as follows:

$$\underline{Processing}ITIF_{rel} = \frac{1}{28}\sum_{i=1}^{28} t_i^{.5} = 1.98 \qquad (4)$$

A similar procedure is followed to determine the $ITIF_{rel}$ for the December 1999 issue of *Engineering*. *Engineering* is a monthly professional journal having a nominal monthly circulation of 72,000. A full page 4-color add costs $10,690.00 A panel of subscribers is also polled to determine readership visits to the journal over days 15–18 into the publication cycle. The sample size n is 31 (which again may be statistically invalid, but is for illustration purposes only). Using a power factor of x=0.5. The inbound traffic intensity factor for the December 1999 issue of *Engineering* is determined by:

$$\underline{Engineering}ITIF_{rel} = \frac{1}{31}\sum_{i=1}^{31} t_1^{.5} = 3.12 \qquad (5)$$

By employing the inbound traffic intensity analysis to the above two publications, it is apparent that the subscribers of *Engineering* spend considerably more time with the monthly journal than the subscribers of *Processing*. The advertiser may feel that the additional cost of the full page ad for *Engineering* is justified, because the readers spend more time with this journal and the ad would be more likely to impact its intended audience, if placed in *Engineering* versus *Processing*.

While the inbound traffic intensity factor has been described herein as being calculated using a particular formula or formulas, it will be understood that other formulas could be used which combine the number of visits with the length of each visit in some,manner to determine a traffic intensity factor. Preferably, although not necessarily, the routine or step calculates the traffic intensity factor by computing the time for each particular visit raised to a preset power and summing together the computed times for each particular visit raised to the preset power. The preset power is typically between zero and one.

Still further, while the system for determining an inbound traffic intensity factor has been described herein as including functionality implemented by one or more programs or routines in a processor and memory, it will be understood that this system can be constructed as any type of device and that the different elements of this system could be produced in or implemented in hardware, firmware or software stored on any type of computer memory, disk or other storage device. If implemented in software, the system could be programmed using any desired programming language, and may be implemented in a standard multi-purpose CPU or on specifically designed hardware or firmware such as, for example, ASICs, if so desired. When implemented in software, the software may be stored in any computer readable memory such as on a magnetic disk, a laser disk, an optical disk, or other storage medium, in a RAM or ROM of a computer or processor, etc. Likewise, this software may be delivered to a user or a device within a process control system via any known or desired delivery method including, for example, on a computer readable disk or other transportable computer storage mechanism or modulated over a communication channel such as a telephone line, the Internet, a satellite link, a cellular link, etc. (which are viewed as being the same as or interchangeable with providing such software via a transportable storage medium).

Furthermore, while the present invention has been described with reference to specific examples, which are intended to be illustrative only, and not to be limiting of the invention, it will be apparent to those of ordinary skill in the art that changes, additions or deletions may be made to the disclosed embodiments without departing from the spirit and scope of the invention.

What is claimed is:

1. A method of evaluating the popularity of a visitable site, the method comprising the steps of:
    obtaining visitor information including a number of visits to a visitable site during a given time period and a duration of each said visit; and
    calculating an inbound traffic intensity factor for the visitable site for the given time period in accordance with the formula:

$$ITIF = \sum_{i=1}^{n} t_i^x$$

wherein ITIF is the inbound traffic intensity factor of the visitable site during the given time period; i is a visit; n represents the number of visits to the visitable site during the given time period; $t_i$ is a number of incremental units of time associated with each visit i, and x is a power factor having a value greater than zero and less than or equal to one;
    determining a quality and intensity of said visits to the visitable site based on the inbound traffic intensity factor.

2. The method of claim 1, wherein n is a total number of visits to the visitable site during the given time period.

3. The method of claim 1, wherein the step of obtaining visitor information includes the step of determining a number of new visitors and a number of repeat visitors and wherein n represents the number of new visitors plus the number of repeat visitors.

4. The method of claim 1, wherein the given time period is a predefined continuous period of time.

5. The method of claim 1, further including the step of reporting the inbound traffic intensity factor using one of a scientific notation or a log scale.

6. The method of claim 1, wherein n is a size of a sample drawn from a total relevant population (N) within the given time period and wherein the step of calculating includes the step of determining an absolute inbound traffic intensity factor as N/n times ITIF.

7. The method of claim 1, wherein n is a size of a sample drawn from a total relevant population within the given time period and wherein the step of calculating includes the step of determining a relative inbound traffic intensity factor as 1/n times ITIF.

8. The method of claim 1, wherein the given time period is one month.

9. The method of claim 1, wherein the duration of each visit $t_i$ is in minutes.

10. The method of claim 1, wherein the visitable site is selected from the group consisting of an internet web site, an intranet web site, a television broadcast, a radio broadcast, a periodical publication, an advertisement in print, radio, television or internet medium, a public exhibition, a tradeshow, a professional meeting, a convention, a museum, an art gallery, and a retail establishment.

11. A method for determining trends in inbound traffic intensity of a visitable site over a plurality of time units comprising the steps of:
    (a) determining an inbound traffic intensity factor for the visitable site for a first one of the time units in said plurality of time units by;
        (i) obtaining visitor information including a number of visits to a visitable site during a given time period and a duration of each said visit; and
        (ii) calculating an inbound traffic intensity factor for the visitable site for the given time period in accordance with the formula:

$$ITIF = \sum_{i=1}^{n} t_i^x$$

wherein ITIF is the inbound traffic intensity factor of the visitable site during the given time period; i is a visit; n represents a number of visits to the visitable site during the given time period; $t_i$ is a number of incremental units of time associated with each visit i, and x is a power factor having a value greater than zero and less than or equal to one;
    (b) determining the inbound traffic intensity factor for the visitable site for at least one next consecutive time unit in said plurality of time units using steps (i) and (ii); and
    (c) comparing the inbound traffic intensity factors from the first time unit and the one next consecutive time unit to determine whether the intensity of inbound traffic to the visitable site is increasing, decreasing or remaining the same from one time unit to the next.

12. The method of claim 11, further including the step of normalizing the inbound traffic intensity factors obtained in steps (a) and (b) to define a normalized inbound traffic intensity factor for the first one of the time units and the next one of the time units.

13. The method of claim 11, wherein each of the time units is a month.

14. A method for ranking visitable sites according to their respective relative inbound traffic intensity factors, comprising the steps of:
collecting data on a number of visits and a duration of each visit to a plurality of visitable sites for a selected period of time;
calculating an inbound intensity factor for each visitable site for the selected time period according to $$ITIF = \sum_{i=1}^{n} t_i^x$$

wherein ITIF is the inbound traffic intensity factor of the visitable site during the given time period; i is a visit; n represents a number of visits to the visitable site during a given time period; $t_i$ is a number of incremental units of time associated with each visit i, and x is a power factor having a value greater than zero and less than or equal to one; and thereafter,
comparing and ranking the visitable sites according to the values of their respective calculated inbound traffic intensity factors.

15. The method of claim 14, further including the step determining if the inbound traffic intensity factor for a site is increasing, decreasing or remaining the same.

16. The method of claim 14, wherein the step of collecting data includes the step of determining a number of new visitors and a number of repeat visitors and wherein n represents the number of new visitors plus the number of repeat visitors.

17. The method of claim 14, wherein the given time period is a continuous period of time.

18. The method of claim 14, wherein the step of comparing and ranking includes the step of displaying the inbound traffic intensity factors using one of a scientific notation or a log scale.

19. A method of evaluating the popularity of a visitable site, the method comprising the steps of:
obtaining visitor information including the number of visits to a visitable site during the given time period and the duration of each said visit;
calculating an inbound traffic intensity factor for the visitable site for a given time period using both a number of visits and a length of each of said visits;
displaying the inbound traffic intensity factor; and
determining a quality and intensity of said visits to the visitable site based on the inbound traffic intensity factor.

20. The method of claim 19, wherein the step of calculating an inbound traffic intensity factor includes the step of computing a time for each particular visit raised to a preset power.

21. The method of claim 20, wherein the step of calculating includes the step of using a preset power having a value between zero and one.

22. The method of claim 20, wherein the step of calculating the inbound traffic intensity factor includes the step of summing the computed times for each particular visit raised to the preset power together.

23. The method of claim 19, wherein the step of calculating the inbound traffic intensity factor includes the step of using the formula:

$$ITIF = \sum_{i=1}^{n} t_i^x$$

wherein ITIF is the inbound traffic intensity factor of the visitable site during the given time period; i is a visit; n represents a number of visits to the visitable site during the given time period; $t_i$ is a number of incremental units of time associated with each visit i, and x is a power factor having a value greater than zero and less than or equal to one.

24. The method of claim 23, wherein n is a total number of visits to the visitable site during the given time period.

25. The method of claim 23, wherein n is a size of sample drawn from a total relevant population (N) within the given time period and wherein the step of calculating includes the step of determining an absolute inbound traffic intensity factor as N/n times ITIF.

26. The method of claim 23, wherein n is a size of a sample drawn from a total relevant population within the given time period and wherein the step of calculating includes the step of determining a relative inbound traffic intensity factor as 1/n times ITIF.

27. The method of claim 19, wherein the step of obtaining visitor information includes the step of determining a number of new visitors and a number of repeat visitors.

28. The method of claim 19, wherein the step of obtaining visitor information includes the step of obtaining the visitor information within a single continuous period of time.

29. The method of claim 19, wherein the step of displaying includes the step of reporting the inbound traffic intensity factor using one of a scientific notation or a log scale.

30. A system for evaluating the visits to a visitable site in a given time period to be used with a computer system including a processor, the system comprising:
a computer-readable memory adapted to be coupled to the processor;
a first routine stored on the memory and adapted to be executed on the processor to obtain visitor information including a number of visits to a visitable site during the given time period and a duration of each said visit;
a second routine stored on the memory and adapted to be executed on the processor to calculate an inbound traffic intensity factor for the visitable site for the given time period using both the number of visits and the duration of each of said visits; and
a third routine stored on the memory and adapted to be executed on the processor to determine a quality and intensity of the visits to the visitable site based on the inbound traffic intensity factor.

31. The system of claim 30, further including a display routine that displays the inbound traffic intensity factor to a user.

32. The system of claim 30, wherein the second routine further calculates the inbound traffic intensity factor by computing a time for each particular visit raised to a preset power.

33. The system of claim 32, wherein the preset power is a value between zero and one.

34. The system of claim 33, wherein the second routine further sums the computed times for each particular visit raised to the preset power together.

35. The system of claim 30, wherein the visitable site is a web site.

36. The system of claim 30, wherein the visitable site is a non-web site.

37. The system of claim 30, wherein the second routine calculates the inbound traffic intensity factor according to the formula:

$$ITIF = \sum_{i=1}^{n} t_i^x$$

wherein ITIF is the inbound traffic intensity factor of the visitable site during the given time period; i is a visit; n represents a number of visits to the visitable site during the given time period; $t_i$ is a number of incremental units of time associated with each visit i, and x is a power factor having a value greater than zero and less than or equal to one.

38. The system of claim 37, wherein n is the total number of visits to the visitable site during the given time period.

39. The system of claim 37, wherein n is a size of a sample drawn from a total relevant population (N) within the given time period and wherein the second routine further determines an absolute inbound traffic intensity factor as N/n times ITIF.

40. The system of claim 37, wherein n is a size of a sample drawn from total relevant population within the given time period and wherein the step of calculating includes the step of determining a relative inbound traffic intensity factor as 1/n times ITIF.

* * * * *